No. 814,207. PATENTED MAR. 6, 1906.
G. E. HAWKINS & H. M. & C. P. STEVENS.
QUAIL TRAP.
APPLICATION FILED DEC. 4, 1905.
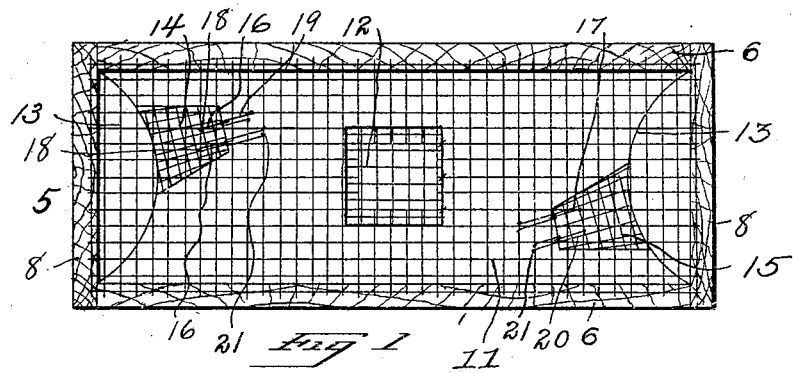
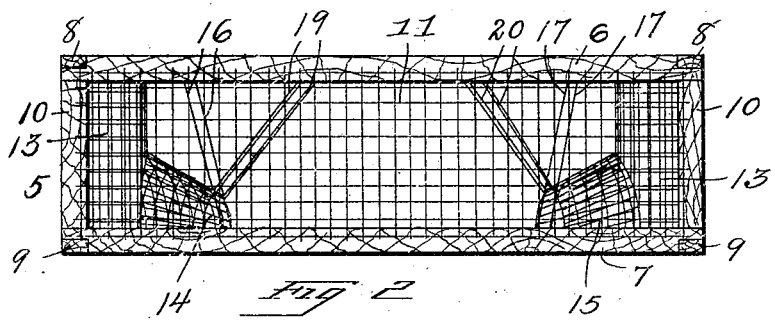
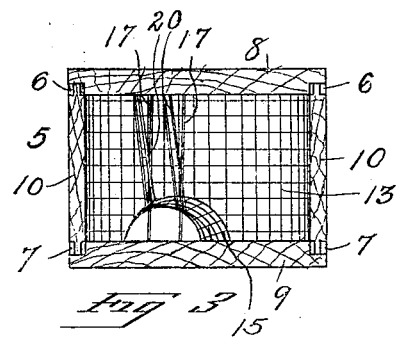
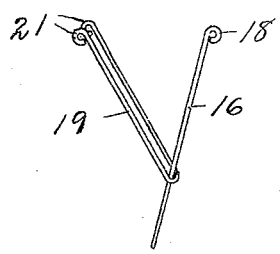
Witnesses
Frank G. Campbell
B. G. Gardner
Inventors
George E. Hawkins,
Horace M. Stevens,
and Charles P. Stevens.
By Shepherd & Parker, Attorneys

UNITED STATES PATENT OFFICE.

GEORGE E. HAWKINS, HORACE M. STEVENS, AND CHARLES P. STEVENS, OF WELBORN, FLORIDA.

QUAIL-TRAP.

No. 814,207.        Specification of Letters Patent.        Patented March 6, 1906.

Application filed December 4, 1905. Serial No. 290,125.

*To all whom it may concern:*

Be it known that we, GEORGE E. HAWKINS, HORACE M. STEVENS, and CHARLES P. STEVENS, citizens of the United States, residing at Welborn, in the county of Suwanee and State of Florida, have invented certain new and useful Improvements in Quail-Traps, of which the following is a specification.

Our invention relates to quail-traps, and has for its object the provision of a device of this character so constructed that quail or other game-birds of approximately the same size as quail or partridges will be permitted ready access to the interior of the trap, but will be effectually prevented from leaving said trap after they have once entered the same.

Further objects and advantages of the invention will be set forth in the detailed description which now follows.

In the accompanying drawings, Figure 1 is a plan view of a quail-trap constructed in accordance with the invention. Fig. 2 is a side elevation of said quail-trap. Fig. 3 is an end elevation of the same; and Fig. 4 is a perspective view of a tunnel-closing member and a guide therefor, which will be hereinafter described.

Like numerals designate corresponding parts in all of the figures of the drawings.

Referring to the drawings, the numeral 5 designates the frame of our improved quail-trap, said frame comprising the upper horizontal side bars 6, lower horizontal side bars 7, upper horizontal end bars 8, lower horizontal end bars 9, and vertical corner-standards 10. The top, bottom, and sides of frame 5 are completely covered by wire-netting 11, which may be of any desired mesh. A wire door 12, located in the netting forming the top of the trap, provides means for removing the captive birds when desired. The end walls (indicated at 13) are also formed of wire and lie in the arc of a circle. These end walls 13 completely close the ends of frame 5, except that an opening is formed therein which communicates with conical wire tunnels 14 and 15. Overlying the inner mouths of the tunnels are wires 16 and 17, said wires having eyelets 18 at their upper ends, which engage portions of the wire which forms the top of the cage in such a manner that said wires 16 and 17 swing from the top of the cage. Guide-bars 19 and 20 are provided with eyelets 21 at their upper ends, said eyelets engaging the wire which forms the closure of the top of the cage, as is clearly illustrated in Fig. 1. The lower ends of these guide-bars 19 and 20 are secured to the top of the inner mouths of the tunnels. Each of the guide-bars comprise a pair of parallel wires between which the wires 16 and 17 are adapted to travel.

The operation of the device is as follows: When it is desired to use the herein-described trap for the purpose of capturing partridges or other game-birds, a suitable bait is placed in the body of the trap through the door 12. Birds attracted by the bait pass through the wire tunnels, pushing aside the wires 16 and 17, which lie at such an angle as to rest of their own weight against the inner mouths of the said tunnels. Guide-bars 19 and 20 prevent lateral movement of the tunnel-closing wires 16 and 17, as will be apparent by referring to Fig. 2. It will be impossible for the birds to leave the trap after they have once entered, owing to the fact that wires 16 and 17 overlie the inner mouths of the tunnel and prevent their egress therethrough. Means are provided to permit birds to enter the trap from both ends of the same. By indenting the end walls in which the wire tunnels are located the birds are rendered less suspicious than would be the case if the tunnels were formed in a vertical wall at that point, for game-birds, such as this trap is designed to capture, are by nature very wary and will only enter a trap after having carefully investigated the same. By indenting the end walls of the trap they are permitted to pass the line of the corner-standards 10 before coming to the tunnels. When they find that they can do this and yet return at will whence they came, their suspicions are allayed and they enter the tunnels more freely than would otherwise be the case.

While the elements herein shown and described are well adapted to serve the purpose for which they are intended, it is to be understood that our invention is not limited to the precise construction set forth, but that changes within the scope of the appended claims may be resorted to without departure from said invention.

Having described our invention, what we claim is—

1. In a trap of the character described, the combination with a cage having indented end walls, of tunnels leading from said end walls to the interior of the cage and wires pivoted for swinging movement, the free ends of said wires overlying the mouths of said tunnels.

5  2. In a trap of the character described, the combination with a cage, of tunnels which converge toward their inner ends, wires connected to the top of said cage, the free ends of which overlie the mouths of said tunnels,
10 guide-bars in which the free ends of said wires are disposed to travel, and a door through which access may be had to the interior of the trap.

In testimony whereof we affix our signatures in presence of two witnesses.

GEORGE E. HAWKINS.
    HORACE M. STEVENS.
    CHARLES P. STEVENS.

Witnesses:
 C. H. BURTON,
 W. R. MOORE.